March 2, 1943.   J. F. STEPHENS   2,312,993
METHOD OF LINING PIPE
Filed Aug. 10, 1938

INVENTOR
Joseph F. Stephens
BY
ATTORNEY

Patented Mar. 2, 1943

2,312,993

UNITED STATES PATENT OFFICE 2,312,993

METHOD OF LINING PIPE

Joseph F. Stephens, Kansas City, Mo., assignor to Gustin-Bacon Manufacturing Company, Kansas City, Mo., a corporation of Missouri Application August 10, 1938, Serial No. 224,097

7 Claims. (Cl. 154—2)

My invention relates to rubber lined pipe and a novel method of making the same.

Rubber lined pipe is useful for many industries, especially in the chemical industry in which liquids corrosive to iron and steel must be transported from place to place through pipe lines.

The present production practice in the confection of rubber lined pipe is a tedious and expensive one, and makes the commodity one of high cost. The rubber lining is extruded in the form of a tube, or a tube formed by lapping the longitudinal edges, and the tube is then put over a mandrel. The outer surface of the tube is coated with a rubber cement, suitable for bonding it to the inside of a steel pipe. It is understood, of course, that the pipe has previously been cleaned free of scale, oil and other foreign matter.

After the mandrel is inserted into the pipe, air is introduced between the tube and the mandrel to permit the mandrel to be removed and to attach the lining to the pipe at a plurality of places. A plurality of air bags are then inserted into the pipe and inflated. These compress the lining between themselves and the pipe. The pipe with the lining held in place by the air bags then placed in a live steam heater to vulcanize the rubber cement and lining. Great difficulty is experienced in keeping the wrinkles out of the rubber lining. When wrinkles occur air is trapped between the lining and the pipe and entrapped during the process of vulcanization. Defective linings thus resulting must be removed and the pipe relined. Otherwise, entrapped air is caused to travel longitudinally between the pipe and the lining, impelled by the pressure and flow of the liquid, thus creating extended areas in which the lining is not attached to the pipe which may either interfere with the free flow within the pipe or permitting of the liquid to destroy the pipe coming in contact with it thus defeating the entire purpose of the lining. The above method of procedure is necessary. If it is attempted to expand the lining by plugging the ends of the pipe and introducing air into the pipe, large and extensive air pockets will be formed. If it is attempted to vulcanize the lining by introducing live steam into the pipe, there is a tendency for those portions of the lining in contact with the pipe to vulcanize immediately with the result that the adhesion is defective and uneven.

One object of my invention is to provide a novel method of fabricating rubber lined pipe.

Another object of my invention is to provide a novel rubber lined pipe.

Other and further objects of my invention will appear from the following description.

In the accompanying drawing which forms part of the instant specification, and which is to be read in conjunction therewith, and in which like reference numerals are used to indicate like parts in the various views, Fig. 1 is a perspective view of the lining assembly prior to its insertion in the pipe to be lined.

In general, my invention contemplates the provision of a layer of fabric about the outside of the rubber lining tube, followed by the cementing of the fabric to the inside of the steel pipe, thus providing a fabric porous layer along which trapped air may migrate, enabling the avoidance of trapped air and its deleterious results.

Figure 1:
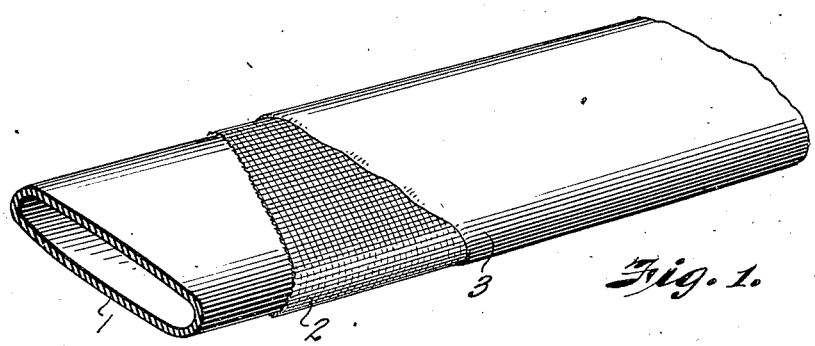
Figure 2:
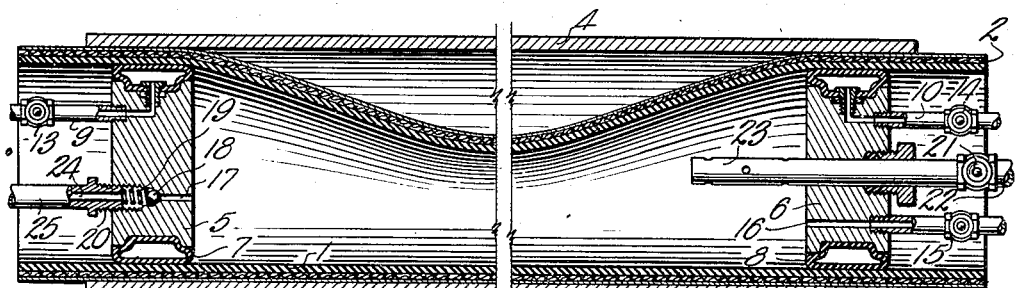
Fig. 2 is a sectional view of the pipe in one stage of the process of lining it.

More particularly, referring now to the drawing, a rubber tube 1 which is to form the lining, is made in any suitable manner, by extruding it or by longitudinally seam lapping an elongated sheet of rubber compound. The unvulcanized rubber tube 1 may be then passed over a suitable mandrel, as is well known to the art, and wrapped with fabric or braided material 2. This fabric material is porous and is preferably placed around the rubber tube 1 with the warp extending longitudinally of the tube. At this stage of my process the rubber tube 1 may be, if desired, partially cured while in place on the mandrel. In many cases the fabric will lend sufficient strength to the unvulcanized rubber tube to enable it to retain its shape. The tube with its fabric cover is then removed from the mandrel by introducing air between the tube and the mandrel, as is well known to the art. Soapstone or powdered mica is then blown into the inside surface of the tube 1 to prevent it from sticking together when the tube is in deflated position. The fabric cover 2 is then covered with a layer of rubber cement 3 suitable for bonding it to the inside wall of the steel pipe. The tube with its fabric cover and coating of rubber cement is then pulled into a pipe 4, the inside surface of which is to be lined. Plugs 5 and 6 are then inserted in the interior of the tube 1 adjacent the ends of the pipe. The plugs 5 and 6 are formed with expandible peripheries 7 and 8. These are expanded by means of compressed air introduced through pipes 9 and 10, by opening valves 13 and 14, respectively. When the expandible annular members 7 and 8 are in position, the parts are in the position shown in Fig. 2.

It is contemplated also to apply the fabric without placing the tube over a mandrel, and in such case soapstone or mica may be blown through the tube to prevent its adhesion in its unvulcanized state, and the fabric wrapped around the tube in its collapsed condition, or the tube might be semi-vulcanized and the fabric coated with vulcanized cement and wrapped around the collapsed tube without the employment of a mandrel.

Figure 3:
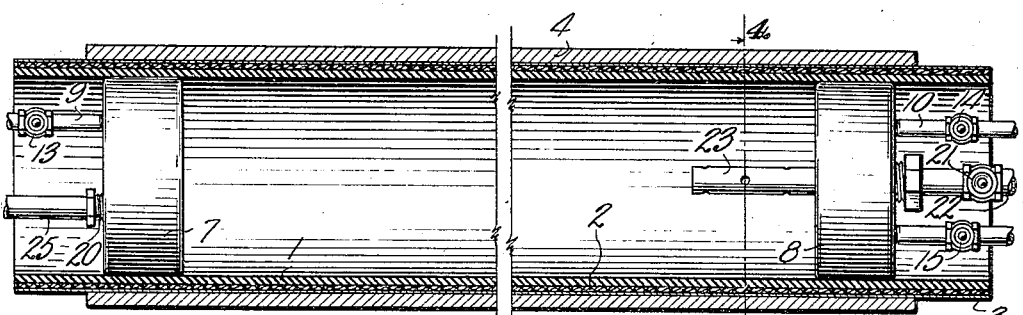
Fig. 3 is a sectional view of the pipe in another stage of the process of lining it.
Figure 4:
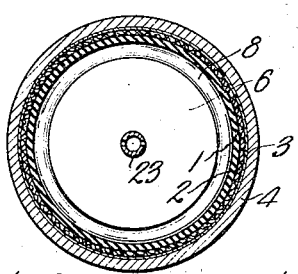
Fig. 4 is a sectional view taken on the line 4—4, Fig. 3.

At this stage of the process, valve 15 is opened permitting fluid under pressure to pass through duct 16 of closure member 6. The fluid under pressure may be compressed air or the like, or if desired, a liquid. This expands the lining including its fabric and rubber cement coatings to the position shown in Fig. 3. The closure member 5 is provided with a duct 17 normally closed by a valve 18 held on its seat by a spring 19. The pressure exerted by the spring tending to hold the valve 18 on its seat, may be varied by rotating screw plug 20. The adjustment is such that a predetermined pressure is exerted by the compressed air throughout the entire space formed by the pipe and the closure members. This pressure forces the lining outwardly and into contact with the inside surface of the pipe to be lined. Any air which is trapped between the deflated lining and the pipe will migrate laterally through the fabric lining and escape to the atmosphere. The contact area of expandible annular members 7 and 8 is sufficiently great to prevent sealing of the fabric layer. The expandible members 7 and 8 are usually made out of rubber or the like. The rubber to rubber contact between the expandible members 7 and 8 and the rubber lining 1, presents an excellent non-skid surface. The pressure existing within the space confined by the plugs carrying members 7 and 8 tends to move the plugs outwardly thus applying tension around the lining, and tending to remove wrinkles. It will be observed that the lining is placed under a tension laterally and is also expanded radially by means of the air pressure. After the lining has assumed the position shown in Fig. 3, valve 15 is closed and valve 21 is opened. Pipe 22 controlled by valve 21 is connected to a source of steam which passes into the interior of the pipe between the plugs through distributing nozzle 23. The steam flows longitudinally through the pipe and is at such pressure that it will lift check valve 18 from its seat and escape through duct 24, which communicates with steam exhaust pipe 25. Steam is at such temperature and under such pressure as to complete vulcanization between the rubber lining and the fabric and between the fabric and the rubber cement, which at the same time is vulcanized to the inside periphery of the steel pipe.

It is understood, of course, that the inside surface of the steel pipe has been cleaned by the removal of scale, dirt and the like. In certain cases it is not necessary first to inflate the lining by means of air. It may be inflated by the use of steam, the steam expanding into the pipe will create the necessary pressure to expand the lining radially and longitudinally, the pressure being determined by the setting of the check valve 18. The vulcanization is not immediate and by the time the rubber lining and the rubber cement are heated to the vulcanization temperatures, the lining will have been expanded.

The fabric or porous layer between the impervious rubber lining and the impervious steel pipe allows the migration of air or gas therealong with its subsequent escape to the atmosphere.

Figure 5:
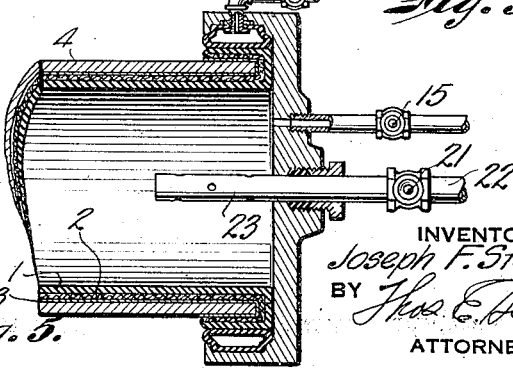
Fig. 5 is a fragmentary view of the end of a pipe being lined by modified apparatus capable of carrying out the process of my invention.

In some instances for use with certain types of coupling members, it is desirable to turn back the ends of the lining over the ends of the pipe, as shown in Fig. 5. In such cases the closure members take the form shown in Fig. 5. The entrapped air or gas escapes through the fabric or porous layer in the same manner as heretofore described.

While the invention has been described using rubber as the lining for pipes, it is contemplated as well to use other types of plastic materials which have the desired characteristics as a pipe lining. Such plastics would be extruded or formed into a tube form and processed in very much the same way as that described in connection with rubber. There would likewise be the identical problem with trapped air and the same solution to the problem could be used as in the case of rubber. Resin base plastics having characteristics similar to that of rubber could be advantageously used for certain types of service It will be observed that I have accomplished the objects of my invention. I have provided a novel and convenient means of fabricating rubber lined pipe while avoiding the difficulties heretofore experienced and resulting from the trapping of air between the lining and the pipe. The fabric interposed between the impervious rubber lining and the impervious steel pipe provides a path for the migration of entrapped air. By means of my method rubber lined pipe may be more conveniently and more cheaply fabricated inasmuch as the yield of usable pipe is greatly increased so that it is not necessary, as is the case at present, to reline the many failures now obtained by the present method.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of manufacturing rubber lined pipe including the steps of positioning a rubber lined tube surrounded by a covering of porous material within the metal pipe to be lined, placing suitable bonding material between the porous covering and the metal pipe, closing the ends of the pipe and expanding the rubber lining and its porous covering against the inner surface of the metal pipe to be lined, and permitting gas entrapped between the rubber lining and the inside surface of the pipe to migrate to the atmosphere through said porous covering.

2. A method of making rubber lined pipe including the steps of forming a tube of rubber lining material, covering said rubber tube with a porous fabric, coating the porous fabric with an adhesive suitable for bonding the fabric to the inside of a metal pipe, placing the rubber lining with its fabric cover and the coating of adhesive within a metal pipe to be lined, closing the ends of the pipe, and introducing fluid under pressure within the pipe to expand the lining assembly against the interior surface of the pipe, and permitting gas entrapped between the rubber lining and the inside surface of the pipe to migrate to the atmosphere through said porous fabric.

3. A method of making rubber lined pipe including the steps of forming a tube of rubber lining material, covering said rubber tube with a porous fabric, coating the porous fabric with an adhesive suitable for bonding the fabric to the inside of a metal pipe, placing the rubber lining with its fabric cover and the coating of adhesive within a metal pipe to be lined, closing the ends of the pipe, introducing fluid under pressure within the pipe to expand the lining assembly against the interior surface of the pipe, permitting gas entrapped between the rubber lining and the inside surface of the pipe to migrate to the atmosphere through said porous fabric, and then introducing steam under pressure into the pipe to vulcanize the rubber lining.

4. A method of making rubber lined pipe including the steps of forming a tube of rubber sheet material, covering said rubber tube with a porous fabric, partially curing the rubber tube, coating the porous fabric with an adhesive suitable for bonding the fabric to the inside of a metal pipe, placing the partially cured rubber lining and its fabric cover and coating of adhesive within the metal pipe to be lined, closing the ends of the pipe, introducing fluid under pressure within the pipe to expand the lining assembly against the interior surface of the pipe, and permitting gas entrapped between the rubber lining and the inside surface of the pipe to migrate to the atmosphere through said porous fabric.

5. A method of making rubber lined pipe including the steps of forming a tube of rubber sheet material, covering said rubber tube with a porous fabric, partially curing the rubber tube, coating the porous fabric with an adhesive suitable for bonding the fabric to the inside of a metal pipe, placing the partially cured rubber lining and its fabric cover and coating of adhesive within the metal pipe to be lined, closing the ends of the pipe, and introducing a fluid under pressure and under elevated temperature sufficient to vulcanize or cure the rubber lining and to force gas entrapped between the rubber lining and the inside surface of the pipe to migrate to the atmosphere through said porous fabric.

6. A method of making rubber lined pipe including the steps of forming a tube of rubber sheet material, covering said rubber tube with a porous fabric, partially curing the rubber tube, coating the porous fabric with an adhesive suitable for bonding the fabric to the inside of a metal pipe, placing the partially cured rubber lining and its fabric cover and coating of adhesive within the metal pipe to be lined, closing the ends of the pipe, introducing fluid under pressure within the pipe to expand the lining assembly against the interior surface of the pipe, permitting gas entrapped between the rubber lining and the inside surface of the pipe to migrate to the atmosphere through said porous fabric, and then introducing steam under pressure into the pipe to complete the curing of the rubber lining.

7. A method as in claim 3 in which the rubber lining and fabric covering are longer than the pipe to be lined, including the step of bending back the ends of the rubber lining and fabric covering over the ends of the pipe being lined whereby a short length of the outside ends of the pipe are covered as well as the interior surface of the pipe.

JOSEPH F. STEPHENS.